United States Patent [19]

Tosaka et al.

[11] Patent Number: 4,917,991

[45] Date of Patent: Apr. 17, 1990

[54] DIRECT POSITIVE SILVER HALIDE PHOTOGRAPHIC MATERIAL

[75] Inventors: Yasuo Tosaka, Sagamihara; Keiji Ogi, Hachioji; Atushi Kamitakahara, Hino, all of Japan

[73] Assignee: Konishiroku Photo Industry Co., Ltd., Tokyo, Japan

[21] Appl. No.: 210,397

[22] Filed: Jun. 23, 1988

Related U.S. Application Data

[63] Continuation of Ser. No. 863,690, May 15, 1986, abandoned.

[30] Foreign Application Priority Data

May 20, 1985 [JP] Japan ............................... 60-106054

[51] Int. Cl.$^4$ ............................ C03C 1/08; C03C 5/26

[52] U.S. Cl. .................................... 430/378; 430/406; 430/567; 430/599; 430/604; 430/605

[58] Field of Search ............... 430/567, 598, 599, 604, 430/605, 378, 406

[56] References Cited

U.S. PATENT DOCUMENTS

| | | | |
|---|---|---|---|
| 3,935,014 | 1/1976 | Klotzer et al. | 430/567 |
| 4,504,570 | 3/1985 | Evans et al. | 430/567 |
| 4,623,612 | 11/1986 | Nishikawa et al. | 430/567 |
| 4,643,965 | 2/1987 | Kubota et al. | 430/567 |

FOREIGN PATENT DOCUMENTS 1027146 4/1966 United Kingdom .

*Primary Examiner*—Hoa Van Le

*Attorney, Agent, or Firm*—Frishauf, Holtz, Goodman & Woodward

[57] ABSTRACT

A direct positive silver halide photographic material with an internal latent image-type silver halide emulsion layer that provides a direct positive image by a fogging treatment (for example, an overall exposure, or surface developing treatment in the presence of a fogging agent) after imagewise exposure. The silver halide particles which form the emulsion layer consist essentially of a core portion made of silver halide and having been chemically sensitized or doped with metal ions. There are provided a plural number of shell portions made of silver halide containing silver chloride. The chloride content of an inner shell adjacent to the outmost shell of the particles has a smaller amount of chloride content than that of the outermost shell. The photographic material is used by first imagewise exposing it to light, effecting overall fogging treatment on the silver halide particles and processing the exposed photographic material to produce the image.

16 Claims, No Drawings

DIRECT POSITIVE SILVER HALIDE PHOTOGRAPHIC MATERIAL

This application is a continuation, of application Ser. No. 863,690, filed May 15, 1986, now abandoned.

BACKGROUND OF THE INVENTION

The invention relates to a direct positive silver halide photographic material, and further detailedly relates to a photographic material which has an internal latent imagetype silver halide emulsion layer that provides a direct positive image by a fogging treatment (for example, an overall exposure, or surface developing treatment in the presence of a fogging agent) after an imagewise exposure.

Conventionally known methods to directly obtain a positive image are roughly classified into two types. One type is the system in which the positive image is obtained after development by using a silver halide emulsion which preliminarily provided fog specks, and destroying fog specks or latent image of the exposed zone with the use of solarization or the Hershell effect. The other type in the system in which the positive image is obtained by fogging treating (treatment for developing speck formation) after the imagewise exposure and then surface developing, or by surface developing during the fogging treatment (treatment for developing speck formation) after the imagewise exposure.

The latter method of the fogging treatment (treatment for developing germ formation) is achieved by an overall exposure, a chemical treatment with a fogging agent, a treatment with a strong developer, or a heat treatment.

The method of the latter type among two methods for forming positive images mentioned above is in general capable of providing photographic materials having a higher sensitivity, compared with the method of the former type and is suitable for uses where high sensitivity is required.

In this technical field, various means have been known, including methods described in U.S. Pat. Nos. 2,592,250, 2,466,957, 2,497,875, 2,588,982, 3,761,266, 3,761,276, and 3,796,577; and British Patent No. 1,151,363.

While photographic materials for formation of positive images can be manufactured by using these well-known technical means at present, further improvement of photographic properties is desired to apply these photographic materials to various photographic fields.

For example, as disclosed in U.S. Pat. Nos. 3,761,267 and 3,206,313, a higher sensitivity is acquired by chemically sensitizing the inside of silver halide particles, or by using a core/shell-type emulsion doped with polyvalent metallic ions. However, such an emulsion has a drawback of low image density. In U.S. Pat. No. 3,761,276, it has been disclosed that a certain extent of chemically ripening treatment is made on the surface of silver halide particles in order to improve the above drawback of low image density. However, such an image is disadvantageous because of a relatively high minimum density, an extremely low stability of the silver halide emulsion during a long term presevation, and a low manufacturing stability.

On the other hand, with a silver halide emulsion mainly composed of silver chloride, which has been disclosed in Japanese Patent O.P.I. Publication No.

32820/1972, the obtained positive image has a relatively high maximum density, however its minimum density is not sufficiently low, and results in unsharpness.

Therefore, in order to fully utilize direct positive photographic materials suitable for the above latter method of the fogging treatment, it is desired to realize an interval latent image-type silver halide emulsion which gives an image with a sufficiently high maximum density and a sufficiently low minimum density, and is excellent in its preservative stability.

SUMMARY OF THE INVENTION

The object of the invention is to provide a highly sensitive silver halide photographic material which gives an image with a sufficiently high maximum density and a sufficiently low minimum density, and excellent in its preservative stability by using a specialized internal latent image-type silver halide emulsion.

After elaborate studies, the inventors have made the invention to attain the above subject.

That is, the direct positive silver halide photographic material of the invention is a photographic material which has at least one silver halide emulsion layer that contains an internal latent image-type silver halide particle whose surface is not preliminarily fogged, and which provides a positive image directly by surface developing during and/or after fogging treatment. The internal latent image-type silver halide particle is composed of both a core which is chemically sensitized or doped with metal ions, and a plurality of shells which is composed of at least two layers that cover said core, among which the outermost shell of the plurality of shells contains more silver chloride than that in a shell adjacent to the outermost shell.

In the invention, the plurality of shells is composed of at least two shells different in their silver chloride content; the outermost shell is composed of silver halide in which the composition ratio of silver chloride is higher than that in silver halide in the layer adjacent to the outermost layer.

The silver halide in the outermost shell may be allowed to be of any halide composition provided that it does substantially contain silver halide, including silver chloride, silver chlorobromide, silver chloroiodobromide, and silver chloroiodide.

The outermost layer of the silver halide particle of the invention can cover the surface of the silver halide particle either wholly or optionally partially. In the invent, however, the outermost shell preferably covers more than 10% of the surface of the silver halide particle.

While in the invention, the shell adjacent to the outermost shell of the plurality of shells contains less silver chloride than that in the outermost layer, its silver chloride content is preferably lower than that in the outermost layer by 10% or more on the basis of the silver chloride content in the outermost layer. Provided that this condition is fulfilled, the silver halide in the adjacent layer may be allowed to be of any halide composition, including silver bromide, silver chlorobromide, silver iodobromide, silver chlorbromide, silver chloroiodide, and silver chloroiodobromide.

While the plurality of shells is composed of at least two layers, the outermost layer and the layer adjacent to it, it may assume either the structure in which layers with different silver halide compositions are laminated, or the structure in which the silver halide composition changes continuously along the direction of the radius of the silver halide particle.

The shells of the silver halide particle of the invention may be composed of more than two shells.

A halide composition in each layer of halide particles of the invention may be obtained through, for example, the method described in J. I. Goldstein and D. B. Williams, "X-ray Analyses in TEM/ATEM; Scanning Electron Microscopy, 1977, vol. 1, IIT Research Institute; p. 651, March, 1977, the method described on page 49 through page 51 in the collection of substances of lectures for Annual Meeting of Society of Photographic Science and Technology of Japan '84, the method described in preprints C-60 through C-63 for "The International East-West Symposium on the Factors Influencing photographic Sensitivity (1984)", the method disclosed in Japanese Patent O.P.I. Publication No. 143331/1985 or the method disclosed in Japanese Patent O.P.I. Publication No. 143332/1985.

The core of the silver halide particle of the invention is preferably composed of silver bromide, and may further contain silver chloride and/or silver iodobromide. The shape of the silver halide particles which compose the core may be of any form, including cubic, regular octahedral, dodecahedral, (or of their mixed form), or spherical, platelike, or amorphous. While the average particle size and the particle size distribution of the silver halide particles which compose the core of the invention can be changed extensively according to the desired photographic properties, the particle size distribution is preferably narrow; that is, the silver halide particles which compose the core of the invention are preferably of monodisperse type substantially.

That the silver halide particles of the core are of monodisperse type means the weight of silver halide particles contained within a range of $\bar{r}\pm20\%$ (where $\bar{r}$ is the average particle size) is more than 60%, preferably more than 70%, especially preferably more than 80% of the weight of all of silver halide particles which compose the core.

The average particle size $\bar{r}$ means the particle size $r_i$ where the product of the frequency $n_i$ and the $r_i^3$ of the particle having a particle size $r_i$ comes to the maximum (significant figures of order: 3; the last figures half-adjusted).

The particle size herein means, in case of a spherical particle, its diameter; and, in case of a particle shaped other than spherical, the diameter of the circle equivalent in area to its projected image.

The particle size can be obtained, for example by magnifying 1 to $5\times10^4$ times the particle using an electron microscopy, and projecting and measuring the diometer or area of the projected image. (It is assumed there are more than 1000 particles to be measured at random.)

In this specification, the term of the average particle size shall be used under the above meaning.

The above core emulsion of monodisperse type can be manufactured using the double jet method discribed in, for example, Japanese Patent Examined Publication No. 36890/973, or Japanese Patent O.P.I. Publication No. 48520/1979 or 65521/1979. In addition, the premix method described in Japanese Patent O.P.I. Publication No. 158220/1979 is also useful.

The core of the silver halide particle in the invention is either chemically sensitized or doped with metallic ions. The chemical sensitization can be carried out with various well-known methods, including the sulfur sensitization, gold sensitization, reduction sensitization, noble metal sensitization, and combined sensitization methods. As a sulfur sensitizing agent, there is useful a compound selected from, thiosulfates, thioureas, thiazoles, rhodanines, and the like. These methods are discribed in, for example, U.S. Pat. Nos. 1,574,944, 1,623,499, 2,410,689, and 3,656,955.

The core of the silver halide particle used in the invention can be sensitized with a water-soluble gold compound as described in, for example, U.S. Pat. Nos. 2,399,083, 2,597,856, and 2,642,361; it can be also sensitized with a reduction sensitizining agent as described in, for example, U.S. Pat. Nos. 2,487,850, 2,518,698, and 2,983,610.

Furthermore, it can be also sensitized using a noble metal (such as platinum, iridium, and palladium) compound as described in, for example, U.S. Pat. No. 2,448,060, and British Patent No. 618,061.

The core of the silver halide particle in the invention can be doped with metal ions. The doping of the core with metal ions can be carried out by adding the metal ions in the form of water-soluble salt during a certain process of formation of the core particles. As such metal ions, there are preferably ions of iridium, lead, antimony, bismuth, gold, osmium, and rhodium. These metal ions are preferably used at a concentration from $1\times10^{-8}$ to $1\times10^{-4}$ mole.

The shells of the silver halide particle in the invention covers the surface area of the core which has been chemically sensitized on doped with metal ions, preferably by more than 50%, and further preferably perfectly.

The shell of the silver halide particle in the invention can be formed with the above double jet or premix method. Then, The Ostwald ripening process is also useful, mixing minute particles of silver halide with the core emulsion.

The surface of the silver halide particle of the invention is preferably unsensitized chemically; otherwise preferably sensitized just slightly.

When the surface of the silver halide particle is chemically sensitized, it can be sensitized in a way similar to the case of the above core.

Preferably, the silver halide particles in the invention have a narrow particle size distribution, or are of monodisperse type substantially even after the formation of the plurality of shells. That is, they are preferably of monodisperse type substantially also as a whole.

That the silver halide particles are of monodisperse type means the weight of silver halide particles contained within a range of $\bar{r}$ (where $\bar{r}$ is the average particle size) is more than 60%, preferably more than 70%, especially preferably more than 80% of the weight of all of silver halide particles.

In the invention, while the ratio of silver halide of the core to silver halide of the shells can be optionally selected, the share of silver halide of the plurality of shells in total silver halide is preferably 10 to 99%.

As for the composition of silver halide particles of the invention, the ratio of silver chloride is preferably 5 to 80% for all of the particles.

The wording of "the surface is not preliminarily fogged" means that the obtained density is less than 0.6, preferably less than 0.4 when the test specimen where its transparent support was applied onto with the emulsion used in the invention at a rat 35 mg Ag per $cm^2$ is, without exposure, developed at 20° C. for 10 minutes with the surface developer A of the following formulation:

Surface developer A:

| | |
|---|---|
| Methol | 2.5 g |
| l-Ascorbic acid | 10 g |
| $NaBO_2.4H_2O$ | 35 g |
| KBr | 1 g |
| Water | to make 1000 ml |

The silver halide emulsion relating to the invention provides a sufficient density when the test specimen which was prepared in the above way is exposed, and developed with the internal developer B of the following formulation:

Internal developer B:

| | |
|---|---|
| Methol | 2 g |
| Sodium sulfite, anhydrous | 90 g |
| Hydroquinone | 8 g |
| Sodium carbonate, monohydrous | 52.5 g |
| KBr | 5 g |
| KI | 0.5 g |
| Water | to make 1000 ml |

More concretely, when a part of the above specimen exposed to a light intensity scale for a given time shorter than about one second, and developed with the internal developer B at 20° C. for 10 minutes, the silver halide emulsion relating to the invention provides the maximum density at least 5 times larger, preferably at least 10 times larger than the case when another part of the test specimen is exposed under the same conditions, and developed at 20° C. for 10 minutes with the surface developer A.

The silver halide emulsion relating to the invention can be optically sensitized with commonly used sensitizing dyes.

The combination of sensitizing dyes used for super sensitization of an internal latent image-type silver halide emulsion or a negative-type silver halide emulsion is also useful for the silver halide emulsion of the invention. As to sensitizing dyes, the description in Research Disclosure Nos. 15162 and 17643 can be referred to.

In the photographic material of the invention, a direct positive image is readily obtained by surface developing after imagewise exposing (photographing) in the usual way. In other words, the main process to form a direct positive image is composed of the treatment to form fog specks by treating, after imagewise exposing, a photographic material which has an internal latent image-type silver halide emulsion with a chemical or optical action, that is, the treatment to surface develope after and/or during the fogging treatment. The fogging treatment can be carried out by overall exposing, or by using a fog speck-forming compound, or a fogging agent.

In the invention, the overall exposure is carried out by uniformly exposing the photographic material which was immersed into or wetted with a developer or other aqueous solution. The light source to be used is allowed to be of any type so long as it provides the light of wave length range suitable for the photographic material. Either a short-time irradiation of a high-illuminant light such a flash, or a long-time irradiation of a weak light is useful. The time of the overall exposure can be extensively adjusted so as to ultimately obtain the best positive image according to the type of the photographic material, developing conditions, and the type of the used light source.

As a fogging agent for the invention, a great variety of compounds are useful. The fogging agent may be contained in any constituent layer (preferably the silver halide emulsion layers) other than the support of the photographic material, or in the developer, or another processing solution before developing, so long as it can be present during the developing process. While the using amount of the fogging agent can be extensively changed according to the purpose, it preferably ranges from 1 to 1500 mg per mole of silver halide when it is added to a silver halide emulsion layer, and from 0.01 to 5 g per liter, especially preferably from 0.05 to 1 g per liter when it is added to the developer or the like.

As a fogging agent used in the invention, there are cited compounds which have a group absorptive to the surface of silver halide, for example, hydrazine compound described in U.S. Pat. Nos. 2,563,785 and 2,588,982; hydrazide or hydrazone compounds described in U.S. Pat. No. 3,227,552; heterocyclic quaternary nitrogen compounds described in U.S. Pat. Nos. 3,615,615, 3,718,478, 3,719,494, 3,734,738 and 3,759,901; and acylhydrazinophenylthiourea compounds described in U.S. Pat. No. 4,030,925. These fogging agents are also effective in combined use. For example, the combined use of nonabsorption-type and absorption-type fogging agent is described in Research Disclosure No. 15162; such a combined use is also effective in the invention.

As for fogging agents, both absorption-type and nonabsorption-type agents are useful; they can be also used effectively in the form of combination.

Useful fogging agents are, for example, hydrazine compounds such as hydrazine hydrochloride, phenylhydrazine hydrochloride, 4-methylphenylhydrazine hydrochloride, 1-formyl -2-(4-methylphenyl) hydrazine, 1-acetyl-2-phenylhydrazine, 1-acetyl-2-(4-acetamidophenyl) hydrazine, 1-benzoyl-2-phenylhydrazine, 1-methylsulfonyl-2-(3-phenylsulonamidophenyl) hydrazine, and formaldehyde phenylhydrazine; N-substituted quaternary cycloammonium saltz such as 3-(2-formylethyl)-2-methylbenzothiazolium bromide, 3-(2-formylethyl)-2-propylbenzothiazolium bromide, 3-(2-acethlethyl)-2-benzylbenzoselenazolium bromide, 3-(2-acetylethyl)-2-benzyl-5-phenyl-benzoxiazolium bromide, 2-methyl-3-[3-(phenylhydrazino) propyl] benzothiazolium bromide, 2-methyl-3-[3-(p-tolylhydrazino) propyl] benzothiazolium bromide, 2-methyl-3-[3-(p-sulfophenylhydrazino) propyl] benzothiazolium bromide, 2-methyl-3-[3-(p-sulfonylhydrazino) pently] benzothiazolium bromide, 2-methyl-3[3-(p-sulfonylhydrazino) pentyl] benzothiazolium iodide, 1,2-dihydro-3-methyl-4-phenylpyrido [2, 1-b] benzothiazolium bromide, 1,2-dihydro-3-methyl-4-phenylpyrido [2, 1-b]-5-phenylbenzoxazolium bromide, 4,4'-ethylene his (1,2-dihydro-3-methylpyrido [2,1-b]benzothiazolium bromide) and 1,2-dihydro-3-methyl-4-phenylpyrido [2,1-b] benzoselenazolium bromide; 5-[1-ethylnaphtho (1,2-b) thiazoline-2-indeneethylidene]-1-(2phnylcarbazoyl) methyl-3-(4-sulfamoylphenyl)-2-thiohydantoin, 5-(3-ethyl-2-benzothiazolinylidene)-3-[4-(2 -formylhydrazino) phenyl] 3-phenylthiourea, and 1, 3-bis [4-(2-formylhydrazino) phenylthiourea.

The photographic material having silver halide emulsion layers of the invention forms a direct positive image either by being overall exposed, or by being surface developed in the presence of a fogging agent after imagewise exposure. The surface development means to treat the photographic material with a developer which does not substantially contain a solvent for silver halide.

As developing agents which can be used in the surface developer used for the development of the photographic material of the invention, there are cited usual silver halide developing agents, for example, polyhydroxylenzenes such as hydroquinone; aminophenols, 3-pyrazolidones, ascorbic acid and its derivatives, Reductons, phenylenediamines, and their mixtures. Concretely, they include hydroquinone, aminophenol, N-methylaminophenol, 1-phenyl-3-pyrazolidone, 1-phenyl-4, 4-dimethyl-3-pyrazolidone, 1-phenyl-4-methyl-4-hydroxymethyl-3-pyrazolidone, ascorbic acid, N, N-diethyl-p-phenylenediamine, diethylamino-O-toluidine, 4-amino-3-methyl-N-ethyl-N-(B-methanesulfonamido-ethyl) aniline, and 4-amino-3-methyl-N-ethyl-N-(B-hydroxyethyl) aniline. It is also effective that such a developing agent is preliminarily contained in the emulsion, and then submitted to the reaction with silver halide during immersing into a high-pH aqueous solution.

The developer used in the invention can additionally contain a specified antifoggant and development inhibitor. These addition agents can be also incorporated into the constituting layers of the photographic material optionally.

Various photographic addition agents such as wetting agents, physical property improvers for layers, and coating aids can be added to the silver halide emulsion relating to the invention according to the purpose. As such wetting agents, for example, hydroxyalkanes are cited. As such physical property improvers, there are suitable, emulsionpolymerized water-dispersible fine particles of polymer substances such as copolymers of alkyl acrylates or alkyl methacrylate with acrylic or methacrylic acid; copolymers of styrene with maleic acid, and copolymers of styrene with maleic anhydride half alkyl esters. As such coating aids, for example, saponin and polyethylene glycol lauryl ether are cited. As other photographic addition agents, there can be used, for example, gelatin plasticizers, surfactants, UV absorbers, pH regulators, antioxidants, antistatic agents, thickening agents, graininess improvers, dyestuffs, mordants, brightenin agent, developing speed regulators, and matting agents.

The silver halide emulsion thus prepared is coated onto a support, through a foundation layer, antihalation undercoating layer and/or filter layer as needed to obtain an internal latent image-type silver halide photographic material.

The application of the photographic material of the invention to the color photography is useful. In that case, it is desirable to incorporate cyan, magenta, and yellow couplers into the silver halide emulsion. As such couplers, commonly used couplers are applicable.

In order to prevent the discoloration of dye image due to the short wave-length active rays, it is effective to use UV absorber such as thiazolidone, benzotriazole, acrylonitrile, or benzophenone compounds. It is especially advantageous the single or combined use of Tinuvins PS, 320, 326, 327, and 328 (Ciba-Geigy).

As a support of the photographic material of the invention, there is cited, for example, a polyethylene terephthalate film, polycarbonate film, polystyrene film, polypropylene film, cellulose acetate film, glass, baryta paper or polyethylene laminate paper, undercoated as needed.

As a protective colloid, on binder for the silver halide emulsion layers relating to the invention, in addition to gelatin, appropriate gelatin derivatives are applicable, including acylated gelatin, guanidylized gelatin, carbamylated gelatin, cyanoethanolized gelatin, and esterified gelatin.

The silver halide emulsion layer of the invention can contain another hydrophilic binder such as colloidal albumin, agar, gum arabic, dextran, alginic acid; cellulose derivative (for example, hydrolysed cellulose acetate with an acetyl content of 19 to 20%), polyacrylimide, imidized polyacrylamide, casein; vinyl alcohol polymer with urethanecarboxylic acid groups of cyanoacetyl groups (for example, vinyl alcohol/vinyl aminoacetate copolymer); polyvinyl alcohol, polyvinylpyrollidone, hydrolysed polyvinyl acetate; polymer which is obtained by polymerization of protein or saturated acylated protein with a vinyl group-bearing monomer; polyvinyl pyridine, polyvinyl amine, polyaminoethyl methacrylate, and polyethyleneamine. Such a binder can be added to the constituent layers of the photographic material, including emulsion layers, intermediate layers, protective layers, filter layers, and back coating layer according to the purpose, and further can be added to with an appropriate plasticizer, lubricant and the like according to the purpose.

The constituent layers of the photographic material of the invention can be hardened with an appropriate hardener. Such a hardener may be selected from chromium salts, Zirconium compounds; aldehyde compounds such as formaldehyde and mucohalogen acids; halotriazine compounds, polyepoxy compounds, ethyleneimine compounds, vinylsulfon compounds, and acryloyl compounds.

While the photographic material of the invention has, on its support, at least one photosensitive emulsion layer containing internal latent image-type silver halide particles, it can also have many various other photographic constituent layers, including filter layers, intermediate layers, protective layers, undercoating layers, backcoating layers, and antihalation layers.

When the photographic material of the invention is used for the full-color photography, the support is coated with at least one red-sensitive silver halide emulsion layer, at least one green-sensitive silver halide emulsion layer, and at least one blue-sensitive silver halide emulsion layer. While, in that case, the internal latent image-type silver halide particles relating to the invention may be contained in at least one photosensitive silver halide emulsion layer, they are preferably contained in all of the photosensitive silver halide emulsion layers. Each of the photosensitive silver halide emulsion layers may be either the same sensitive layer or separated into two or more differently sensitive layers. While the latter case, at least one layer of the differently sensitive layers contains the internal latent image-type silver halide particles relating to the invention, all of them preferably contain the internal latent image-type silver halide particles.

The photographic material of the invention can be effectively applied to various uses, including the general use monochromatic, X-ray, color, false color, graphic arts, IR, micro-, and silver dye bleaching photographies. It can be also applied to the colloid transcription method, the silver salt diffusion transfer method, and the color image transfer or color diffusion transfer method described in U.S. Pat. Nos. 3,087,817, 3,185,567 and 2,983,606 by Rogers; U.S. Pat. No. 3,253,915 by Weiyerts et al.; U.S. Pat. No. 3,227,550 by Whitemore et al.; U.S. Pat. No. 3,227,551 by Barr; U.S. Pat. No. 3,227,552 by Whitemore et al.; and U.S. Pat. Nos. 3,415,644, 3,415,645, and 3,415,646.

By the use of the internal latent image-type silver halide emulsion inherent to the invention, a highly sensitive silver halide photographic material can be obtained which provides a sufficiently large maximum density and a sufficiently small minimum density, and is excellent in its preservative stability.

EXAMPLES

The invention is illustrated by the following examples, but the mode of the invention is not limited by these examples.

EXAMPLE 1

A monodispersed core/shell emulsion was prepared in the following manner:

While an aqueous solution containing gelatin is maintained at 50° C., it was added to with aqueous silver nitrate solution and aqueous potassium bromide solution simultaneously for 50 minutes by controlled double-jet method to yield cubic silver bromide emulsion having an average particle size of 0.5 μm. The obtained core emulsion is added to with sodium thiosulfate at a rate of 2.0 mg per mole of silver and potassium gold chloride at a rate of 1.5 mg per mole of silver, and then was chemically digested for 60 minutes at 60° C. This emulsion is referred to as emulsion A.

Then, the emulsion A was divided into aliquots to prepare the following emulsions B through F.

Emulsion B:—To an aliquot of emulsion A as core, further was added aqueous silver nitrate solution and aqueous potassium bromide solution concurrently to yield cubic core/shell-type emulsion having on average particle size of 0.7 μm. The obtained emulsion is referred to as emulsion B which is a monodispersed emulsion having a narrow particle size distribution.

Emulsion C:—Another aliquot of emulsion A as core further was added to with aqueous silver nitrate solution and aqueous sodium chloride solution concurrently to yield cubic core/shell-type emulsion having an average particle size of 0.7 μm. The obtained emulsion is referred to as emulsion C, which is a monodispersed emulsion.

Emulsion D:—Another aliquot of emulsion A as core was further added to with aqueous silver nitrate solution and aqueous solution equimolarly containing both potassium bromide and sodium chloride concurrently to yield cubic core/shell-type emulsion having an average particle size of 0.7 μm. The obtained emulsion is referred to as emulsion D, which is a monodispersed emulsion.

Emulsion E:—Another aliquot of emulsion A as core further was added to with aqueous silver nitrate solution and aqueous solution of potassium bromide concurrently to grow the average particle size up to 0.65 μm, and subsequently added to with aqueous silver nitrate solution and aqueous sodium chloride solution concurrently to yield cubic core/shell-type emulsion having an average particle size of 0.7 μm. The obtained emulsion is refered to as emulsion E, which is a monodispersed emulsion.

Emulsion F:—Another aliquot of emulsion A as core further was added to with aqueous silver nitrate solution and aqueous solution equimolarly containing both potassium bromide and sodium chloride concurrently to grow the average particle size up to 0.63 μm, and subsequently added to with aqueous silver nitrate solution and aqueous sodium chloride solution concurrently to yield cubic core/shell-type emulsion having an average particle size of 0.7 μm. The obtained emulsion is referred to as emulsion F, which is a monodispersed emulsion.

Each of the above emulsions B through F was added to with sodium thiosulfate at a rate of 1.0 mg per mole of silver, and then submitted to a chemical sensitization treatment for 30 minutes at 55° C.

Each of both chemically surface-sensitized emulsions B to F and the chemically surface-unsensitized emulsions B to F was added to with a certain commonly used extender and hardener, and then was applied onto a cellulose triacetate support at a rate of 35 mg Ag per 100 cm$^2$, and dried to prepare a sample.

After the sample was kept at 20° C. and RH55% (Condition 1), or at 50° C. and RH80% (Condition 2) for 3 days, it was exposed through an optical wedge using a sensitometer (hereinafter referred to as wedge exposure), and processed with a developer of the following formulation at 20° C. for 4 minutes, and then washed, fixed, washed again, and dried in the usual way:

| | |
|---|---|
| Phenidone | 0.4 g |
| Sodium sulfite, anhydrous | 75 g |
| Hydroquinone | 10 g |
| Sodium carbonate, monohydrous | 40 g |
| Potassium bromide | 4 g |
| 5-Methylbenzotriazole | 10 mg |
| 1-Acetyl-2-phenylhydrazine (fogging agent) | 0.1 g |
| water | to make 1000 ml |
| Sodium hydroxide | to adjust pH to 12.5 |

The maximum and minimum density of the obtained positive image were measured. The results are shown in Table 1.

TABLE 1

| Sample No. | Emulsion | Surface chemical sensitiz. | Density (cond.1) Max. | Density (cond.1) Min. | Density (cond.2) Max. | Density (cond.2) Min. | Remark |
|---|---|---|---|---|---|---|---|
| 1 | B | no | 0.36 | 0.14 | 0.35 | 0.20 | Compar. |
| 2 | B | yes | 0.67 | 0.28 | 0.29 | 0.31 | Compar. |
| 3 | C | no | 0.77 | 0.38 | 0.62 | 0.43 | Compar. |
| 4 | C | yes | 0.81 | 0.66 | 0.84 | 0.69 | Compar. |
| 5 | D | no | 0.56 | 0.29 | 0.55 | 0.35 | Compar. |
| 6 | D | yes | 0.78 | 0.41 | 0.74 | 0.47 | Compar. |
| 7 | E | no | 0.84 | 0.20 | 0.80 | 0.22 | Inv. |
| 8 | E | yes | 0.88 | 0.23 | 0.82 | 0.25 | Inv. |
| 9 | F | no | 0.87 | 0.18 | 0.82 | 0.19 | Inv. |
| 10 | F | yes | 0.94 | 0.22 | 0.86 | 0.24 | Inv. |

As seen in Table 1, the emulsion of the invention gives a large maximum density and a small minimum density, and excellent in storage stability.

EXAMPLE 2

A monodispersed core/shell emulsion was prepared in the following way.

Equimolar aqueous solutions of both silver nitrate and potassium bromide were simultaneously added to an aqueous gelatin solution at 50° C. for 40 minutes by a controlled double jet method to obtain a tetradecahedral silver bromide emulsion of average particle size of 0.6 μm. The obtained core emulsion was adde to with 2.0 mg of sodium thiosulfate per mole of silver, and chemically ripened at 60° C. for 60 minutes. This emulsion is referred to as emulsion G.

Then, the emulsion G was divided into aliquots to prepare the following emulsions H through M.

Emulsion H:—An aliquot of emulsion A as core was further added to with aqueous silver nitrate and aqueous sodium chloride solution concurrently to grow the particles up to an average particle size of 0.65 μm, and subsequently added to with aqueous silver nitrate solution and aqueous potassium bromide concurrently to obtain a core/shell-type tetradecahedral emulsion of average particle size of 0.75 μm. This emulsion is referred to as emulsion H, which is a monodispersed emulsion.

Emulsion I:—Another aliquot of emulsion G as core was further added to with aqueous silver nitrogen solution and aqueous solution containing potassium bromide and sodium chloride (molar ratio KBr:NaCl=50:50) to grow the particles up to an average particle size of 0.68 μm, and subsequently added to with aqueous silver nitrate solution and aqueous potassium bromide solution concurrently to obtain cubic core/shell-type emulsion of particle size of 0.80 μm. This emulsion is referred to as emulsion I, which is a monodispersed emulsion.

Emulsion J:—Another aliquot of emulsion G as core was further added to with aqueous silver nitrate solution and aqueous potassium bromide solution concurrently to grow the particle up to particle size of 0.65 μm, and subsequently added to with aqueous silver nitrate solution and aqueous solution containing potassium bromide and sodium chloride (molar ratio KBr:NaCl=90:10) concurrently to obtain cubic core/-shell-type emulsion of average particle size of 0.75 μm. This emulsion is referred to as emulsion J, which is a monodispersed emulsion.

Emulsion K:—Another aliquot of emulsion G as core was further added to with aqueous silver nitrate solution and aqueous solution containing potassium bromide and sodium chloride (molar ratio KBr:NaCl=80:20) concurrently to grow the particles up to average particle size of 0.65 μm, and subsequently added to with aqueous silver nitrate solution and aqueous solution containing potassium bromide and sodium chloride (molar ratio KBr:NaCl=50:50) concurrently to obtain cubic core/shell-type emulsion of average particle size of 0.75 um. This emulsion is referred to as emulsion K, which is a monodispersed emulsion.

Emulsion L:—Another aliquot of emulsion G as core was further added to with aqueous silver nitrate solution aqueous potassium bromide solution, and aqueous sodium chloride solution to obtain cubic core/shell-type emulsion of average particle size of 0.70 μm. The ratio of adding potassium bromide solution to aqueous sodium chloride solution was continuously changed from the molar ratio KBr:NaCl=90:10 at the early stage to the molar ratio KBr:NaCl=5:95 at the terminal stage. This emulsion is referred to as emulsion L, which is a monodispersed emulsion.

Emulsion M:—Another aliquot of emulsion G as core was further added to with aqueous silver nitrate solution and aqueous potassim bromide solution concurrently to grow the particles up to average particle size of 0.65 μm, and subsequently added to with aqueous silver nitrate solution and aqueous solution containing potassium bromide, sodium chloride and potassium iodide (molar ratio KBr:NaCl:KI=48:50:2) concurrently to grow the particle up to average particle size of 0.70 μm, and subsequently added to with aqueous silver nitrate solution and aqueous sodium chloride solution concurrently to obtain cubic core/shell-type emulsion of average particle size of 0.73 μm. This emulsion is referred to as emulsion M, which is a monodispersed emulsion.

Each of the above emulsions H to M was added to with the following sensitizing dye:

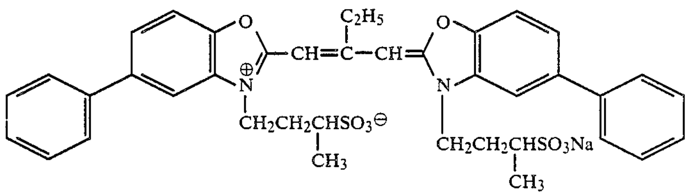

On the other hand, 1-(2,4,6-trichlorophenyl)-3-(2-chloro-5-octadecylsuccinimidoanilino)-5-pyrazolone as a magenta coupler was dissolved into a mixed solvent of dibutyl phthalate and ethyl acetate, and was dispersed into a gelatin solution to make an emulsive dispersion.

Then each of the above emulsions H to M was added to with this emulsive dispersion, mixed together, added to with a hardener, and applied onto a cellulose triacetate support at a rate of 20 mg of silver per 100 $cm^2$, and then dried to obtain a sample.

The sample was wedge exposed using a yellow filter, and developed with a developer of the following formulation at 30° C. for 3 minutes:

| | |
|---|---|
| 4-Amino-3-methyl-N-ethyl-N-(β-methanesulfonamidoethyl) aniline sulfate | 5 g |
| Sodium sulfite, anhydrous | 2 g |
| Sodium carbonate, monohydrous | 15 g |
| Potassium bromide | 1 g |
| Benzyl alcohol | 10 ml |
| Water | to make 1000 ml |
| Potassium hydroxide | to adjust pH to 10.2 |

The sample was overall exposed to 1-lux white light for 20 seconds from 20 seconds after the initiation of development, and then washed, bleached, fixed, washed again, and dried.

The magenta image of the sample was measured. The results are shown in Table 2.

TABLE 2

| Sample No. | Emulsion | Max. density | Min. density | Remark |
|---|---|---|---|---|
| 11 | H | 1.08 | 0.37 | Compar. |
| 12 | I | 1.25 | 0.31 | Compar. |
| 13 | J | 1.80 | 0.25 | Inv. |
| 14 | K | 1.85 | 0.24 | Inv. |
| 15 | L | 2.02 | 0.20 | Inv. |
| 16 | M | 1.99 | 0.18 | Inv. |

As seen in Table 2, the emulsion of the invention gives a large maxmum density, and a small minimum density, and exhibits good positive properties.

EXAMPLE 3

The emulsion B was divided into aliquot, which were used to prepare emulsions B1 to B3, respectively, by precipitating silver chloride in the following way:

Emulsion B-1:—An aliquot of emulsion B was added to with 1% (on the basis of silver halide in emulsion B) aqueous sodium chloride solution, and, after 1 munute, added to with the equimolar aqueous silver nitrate solution, and the stirred for 20 minutes. The obtained emulsion is referred to as emulsion B-1.

Emulsion B-2:—Emulsion B-2 was obtained in the way same as for emulsion B-1, except that the amount of both aqueous sodium chloride solution and aqueous silver nitrate solution added was 5 mol %.

Emulsion B-3:—Emulsion B-3 was obtained in the way same as for emulsion B-1, except that the amount of both aqueous sodium chloride solution and aqueous silver nitrate solution added was 20 mol %.

Each of the above emulsions B and B1 to B3 was added to with an extender and hardener, and applied onto a cellulose triacetate support at a rate of 35 mg of silver per 100 $cm^2$, and then dried to obtain a sample.

The obtained sample was exposed and developed in the same way as in Example 1. The maximum and minimum densities of the obtained positive image were measured. The results are shown in Table 3.

TABLE 3

| Sample No. | Emulsion | Max. density | Min. density |
|---|---|---|---|
| 1 | B | 0.36 | 0.14 |
| 17 | B-1 | 0.69 | 0.17 |
| 18 | B-2 | 0.75 | 0.20 |
| 19 | B-3 | 0.84 | 0.20 |

In the invention, as seen in Table 3, the larger the silver chloride content in the outermost shell layer than that in the adjacent layer, the larger the maximum density becomes.

EXAMPLE 4

Aqueous gelatin solution was added to with aqueous silver nitrate solution and aqueous potassium bromide solution equimolarly and concurrently with a double jet method at 50° C., taking 40 minutes, to obtain tetradecahedral silver bromide emulsion of average particle size of 0.6 μm. To the solution, 0.02 mg of potassium hexachloroiridate was added 5 minutes after the initiation of the addition of the above both salt solutions. The obtained emulsion was further added to with aqueous silver nitrate solution and aqueous solution containing potassium bromide and sodium chloride (molar ratio KBr:NaCl=55:45) concurrently to grow the particles up to average particle size of 0.65 um, and subsequently added to with aqueous silver nitrate solution and aqueous potassium chloride solution concurrently to obtain cubic core/shell-type emulsion of average particle size of 0.68 μm. This emulsion is referred to as emulsion N, which is a monodispersed emulsion.

The above emulsion N was applied and dried in the way same as in Example 2, and the obtained sample was exposed and developed in the way same as in Example 2. The maximum and minimum densities of the obtained positive image were measured. The results are shown in Table 4.

TABLE 4

| Sample No. | Emulsion | Max. density | Min. density |
|---|---|---|---|
| 20 | N | 1.98 | 0.15 |

As seen in Table 4, the emulsion of the invention which was doped with metal ion also gives a good positive image.

EXAMPLE 5

Aqueous gelatin solution was added to with aqueous silver nitrate solution and aqueous potassium bromide solution equimolarly and concurrently to obtain cubic core-type emulsion of average particle size of 0.27 μm. The obtained emulsion was added to with 4.0 mg of sodium thiosulfate per mole of silver, and 4.0 g of potassium chloroaurate, and chemically ripened at 60° C. for 60 minutes. The emulsion was further added to with aqueous silver nitrate solution and aqueous solution containing potassium bromide and sodium chloride (molar ratio KBr:NaCl=50:50) concurrently to obtain cubic silver bromide emulsion. The emulsion was further added to with aqueous silver nitrate solution and aqueous sodium chloride solution concurrently to obtain cubic core/shell-type emulsion of average particle size of 0.50 μm.

The above emulsion was added to with 2.5 mg of sodium thiosulfate per mole of silver, and chemically ripened at 50° C. for 40 minutes. This emulsion is referred to as emulsion P.

The above emulsion P was applied and dried in the way same as in Example 2, and the obtained sample was exposed and developed in the way same as in Example. The maximum and minimum densities of the obtained positive image were measured. The results are shown in Table 5.

TABLE 5

| Sample No. | Emulsion | Max. density | Min. density |
|---|---|---|---|
| 21 | P | 2.08 | 0.14 |

As seen in Table 5, the emulsion P of the invention also gives a good positive image.

What is claimed is:

1. A direct positive silver halide photographic material which has at least one silver halide emulsion layer containing internal image-type silver halide particles of which surface is not preliminarily fogged, and providing a positive image by surface developing during and/or after a fogging treatment after an imagewise exposure, said internal image-type silver halide particle consisting essentially of a core chemically sensitized or doped with a metal ion and a plurality of shells covering said core, among which the outermost shell of said plurality shells contains more silver chloride than that in a shell adjacent to said outermost shell.

2. The direct positive silver halide photographic material of claim 1, wherein the content of silver chloride in the layer adjacent to the outermost shell is lower than that in the outermost layer by 10% or more on the basis of the silver chloride content in the outermost shell.

3. The direct positive silver halide photographic material of claim 1, wherein the whole content of silver chloride in said silver halide particles is within the range 5 to 80%.

4. The direct positive silver halide photographic material of claim 1, wherein the surface of said silver halide particles is not chemically sensitized.

5. The direct positive silver halide photographic material of claim 1, wherein the surface of said silver halide particles is slightly chemically sensitized.

6. The direct positive silver halide photographic material of claim 1, wherein a maximum density of said silver halide emulsion layer exposed and internally developed at least 5 times larger than the maximum density of said silver halide emulsion layer exposed and surface developed.

7. The direct positive silver halide photographic material of claim 1, wherein the maximum density of said silver halide layer obtained by a exposing for a given time shorter than about one second and developing with an internal developer the composition of which is shown below at 20° C. for 10 minutes is at least 5 times larger than the maximum density of said silver halide layer obtained by the exposing under the same conditions and developing with a surface developer the composition of which is shown below at 20° C. for 10 minutes:

| | | |
|---|---|---|
| [Composition of internal developer] | | |
| Methol | 2 | g |
| Sodium sulfite, anhydrous | 90 | g |
| Hydroquinone | 8 | g |
| Sodium carbonate, monohydrous | 52.5 | g |
| KBr | 5 | g |
| KI | 0.5 | g |
| Water to make | 1000 | ml |
| [Composition of surface developer] | | |
| Methol | 2.5 | g |
| l-Ascorbic acid | 10 | g |
| $NaBO_2.4H_2O$ | 35 | g |
| KBr | 1 | g |
| Water to make | 1000 | ml. |

8. A direct positive silver halide light-sensitive photographic material comprising a support and, provided thereon, a light-sensitive emulsion layer containing internal image-type silver halide particles of core/shell structure, said silver halide particles consist essentially of a core portion made of silver halide selected from the group consisting of silver bromide, silver chlorobromide and silver iodochlorobromide, said core having been chemically sensitized or doped with metal ions; and a plural number of shell portions made of a silver halide containing silver chloride, the chloride content of an inner shell adjacent to the outermost shell being smaller than that of the outermost shell.

9. The photographic material of claim 8 wherein the chloride content of said inner shell adjacent to the outermost shell of said silver halide particle, is smaller by 10% or more based on the silver chloride content in the outermost shell.

10. The photographic material of claim 9 wherein the whole content of silver chloride in said silver halide particles is within the range of 5 to 80%.

11. The photographic material of claim 8 wherein the whole content of silver chloride in said silver halide particles is within the range of 5 to 80%.

12. A method of forming a direct positive silver image comprising, imagewise exposing a direct positive silver halide light-sensitive photographic material to light, said photographic material comprising a support and, provided thereon, a light-sensitive emulsion layer containing internal image-type silver halide particles of core/shell structure, the silver halide particle consisting essentially of a core portion made of silver halide selected from the group consisting of a silver bromide, a silver chlorobromide and a silver iodochlorobromide, said core having been chemically sensitized or doped with metal ions, and comprising a plural number of shell portions made of a silver halide containing silver chloride, the chloride content of an inner shell adjacent to the outermost shell being smaller than that of the outermost shell;

effecting overall fogging treatment on the silver halide particles, and processing the exposed photographic material with a solution containing a developing agent.

13. The method of claim 12, wherein said light-sensitive emulsion layer further contains a dye-forming coupler.

14. The method of claim 12 wherein the chloride content of the inner shell adjacent to the outermost shell of said silver halide particle, is smaller by 10% or more based on the silver chloride content in the outermost shell.

15. The method of claim 14 wherein the whole content of silver chloride in said silver halide particles is within the range of 5 to 80%.

16. The method of claim 12 wherein the whole content of silver chloride in said silver halide particles is within the range of 5 to 80%.

* * * * *